United States Patent
Drerup et al.

(10) Patent No.: US 7,625,174 B2
(45) Date of Patent: Dec. 1, 2009

(54) METHODS AND APPARATUS FOR ASSEMBLING GAS TURBINE ENGINE STATOR ASSEMBLIES

(75) Inventors: Vincent Marion Drerup, Cincinnati, OH (US); Harold Ray Hansel, Mason, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 11/303,884

(22) Filed: Dec. 16, 2005

(65) Prior Publication Data

US 2007/0140843 A1 Jun. 21, 2007

(51) Int. Cl.
 *F01D 9/04* (2006.01)
(52) U.S. Cl. ...................... 415/135; 415/139
(58) Field of Classification Search ................. 416/190; 415/135, 136, 138, 139
See application file for complete search history.

(56) References Cited

U.S. PATENT DOCUMENTS

| | | | |
|---|---|---|---|
| 3,568,930 A | | 3/1971 | Kuchar |
| 4,029,436 A | * | 6/1977 | Shoup et al. ............ 416/193 A |
| 4,492,517 A | | 1/1985 | Klompas |
| 4,524,980 A | * | 6/1985 | Lillibridge et al. ...... 416/193 A |
| 4,767,267 A | | 8/1988 | Salt et al. |
| 5,249,920 A | | 10/1993 | Shepherd et al. |
| 6,261,056 B1 | | 7/2001 | Wilson |
| 6,595,745 B1 | | 7/2003 | Mohammed-Fakir et al. |
| 6,641,144 B2 | | 11/2003 | Mohammed-Fakir et al. |
| 6,752,592 B2 | | 6/2004 | Mohammed-Fakir et al. |
| 6,764,081 B2 | | 7/2004 | Mohammed-Fakir et al. |
| 6,837,686 B2 | * | 1/2005 | Di Paola et al. .......... 416/220 R |
| 7,094,026 B2 | | 8/2006 | Coign et al. |

* cited by examiner

*Primary Examiner*—Richard Edgar
(74) *Attorney, Agent, or Firm*—William Scott Andes, Esq.; Armstrong Teasdale LLP

(57) ABSTRACT

A method for assembling a gas turbine engine is provided. The method comprises coupling a first turbine nozzle within the engine, coupling a second turbine nozzle circumferentially adjacent the first turbine nozzle such that a gap is defined between the first and second turbine nozzles and providing at least one spline seal including a substantially planar body. The method also comprises forming at least one catch to extend outward from the body portion of the at least one spline seal, and inserting the at least one spline seal into a slot defined in at least one of the first and second turbine nozzles to facilitate reducing leakage through said gap, such that a portion of the at least one spline seal is received within a recess defined within the turbine nozzle slot to facilitate retaining the at least one spline seal within the turbine nozzle slot.

19 Claims, 7 Drawing Sheets

METHODS AND APPARATUS FOR ASSEMBLING GAS TURBINE ENGINE STATOR ASSEMBLIES

BACKGROUND OF THE INVENTION

This invention relates generally to turbine engines and more particularly, to methods and apparatus for assembling gas turbine engines.

Known gas turbine engines include combustors which ignite fuel-air mixtures which are then channeled through a turbine nozzle assembly towards a turbine. At least some known turbine nozzle assemblies include a plurality of arcuate nozzle segments arranged circumferentially. At least some known turbine nozzles include a plurality of circumferentially-spaced hollow airfoil vanes coupled by integrally-formed inner and outer band platforms. More specifically, the inner band forms a portion of the radially inner flowpath boundary and the outer band forms a portion of the radially outer flowpath boundary.

Within known turbine nozzle assemblies, the turbine nozzle segments are coupled circumferentially within the turbine engine. More specifically, because of temperature differentials that may develop and to accommodate thermal expansion, known turbine nozzles are positioned such that a gap or clearance is defined between pairs of circumferentially-adjacent nozzles. To facilitate preventing cooling air supplied to such nozzle segments from leaking through the clearance gaps, at least some known turbine nozzle assemblies include a plurality of spline seals.

Known spline seals are substantially flat pieces of material that are inserted within slots defined in the turbine nozzles. More specifically, at least some known nozzle assemblies include a loading slot that facilitates the installation of the spline seals within the spline seal slots. However, depending on the operation of the turbine engine, at least some known spline seals may undesirably slip out of the spline seal slots through the loading slot. Such seals may be channeled downstream and cause damage to other engine components. Moreover, over time, continued operation with decreased cooling of the turbine nozzles adjacent such spline seal slots may limit a useful life of the turbine nozzle.

BRIEF SUMMARY OF THE INVENTION

In one aspect, a method for assembling a gas turbine engine is provided. The method comprises coupling a first turbine nozzle within the engine, coupling a second turbine nozzle circumferentially adjacent the first turbine nozzle such that a gap is defined between the first and second turbine nozzles and providing at least one spline seal including a substantially planar body. The method also comprises forming at least one catch to extend outward from the spline seal body, and inserting the at least one spline seal into a slot defined in at least one of the first and second turbine nozzles to facilitate reducing leakage through said gap, such that a portion of the at least one spline seal is received within a recess defined within the turbine nozzle slot to facilitate retaining the at least one spline seal within the turbine nozzle slot.

In another aspect, a seal assembly for use with a turbine engine turbine nozzle assembly is provided. The seal assembly includes at least one spline seal sized for insertion within a slot formed within a turbine nozzle. The at least one spline seal is configured to facilitate reducing leakage through the turbine engine turbine nozzle assembly, and includes a substantially planar body and at least one catch extending outward from said body. A portion of the at least one spline seal is sized for insertion within a recess defined within the turbine nozzle slot.

In a further aspect, a turbine nozzle assembly for a gas turbine engine is provided. The nozzle assembly includes a plurality of turbine nozzles and a seal assembly. Each turbine nozzle includes an outer band, an inner band, and at least one airfoil vane extending between the outer and inner bands. A portion of each of the plurality of turbine nozzles defines a slot therein. The slot includes at least one recessed portion defined therein. The seal assembly includes at least one spline seal sized for insertion within the turbine nozzle slot to facilitate reducing leakage between circumferentially adjacent pairs of the turbine nozzles. The at least one spline seal includes a substantially planar body and at least one catch extending outward from the body. A portion of the at least one spline seal is sized for insertion within the at least one slot recess.

DETAILED DESCRIPTION OF THE INVENTION

Figure 1:
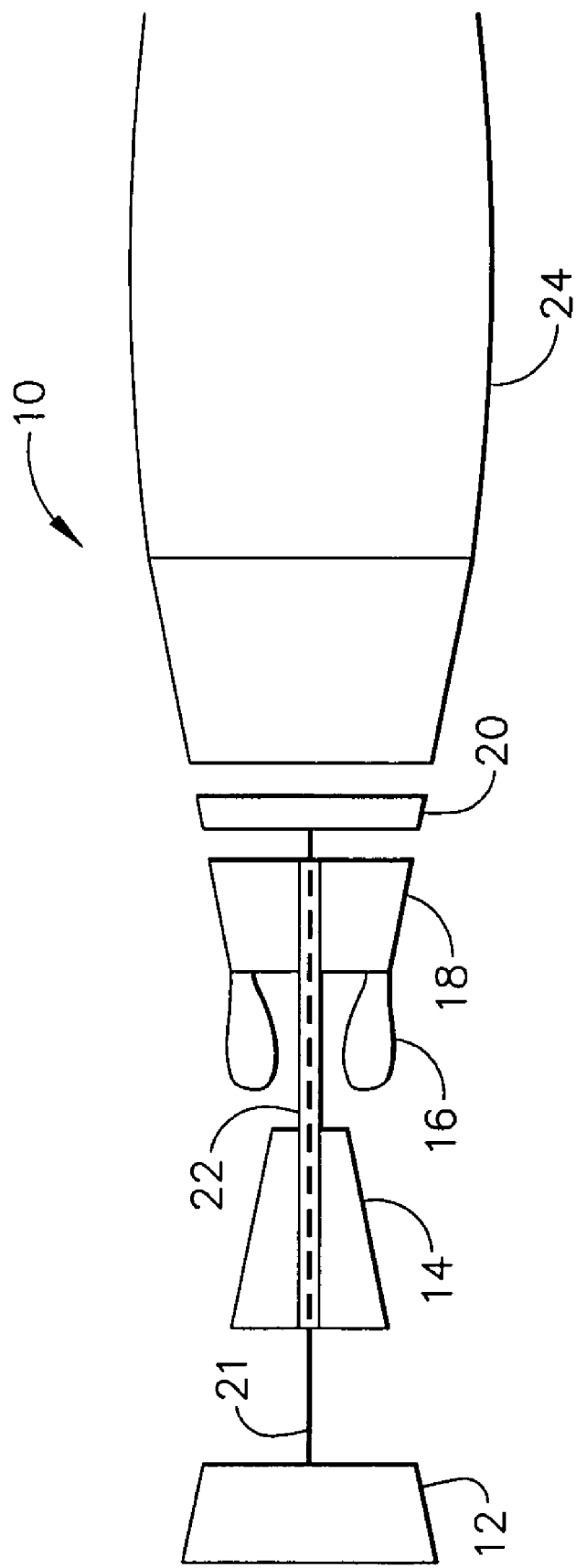
FIG. 1 is a schematic illustration of an exemplary gas turbine engine.

FIG. 1 is a schematic illustration of an exemplary gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22. In one embodiment, gas turbine engine 10 is an LM2500 engine commercially available from General Electric Aircraft Engines, Cincinnati, Ohio. In another embodiment, gas turbine engine 10 is a CFM engine commercially available from General Electric Aircraft Engines, Cincinnati, Ohio.

In operation, air flows through low pressure compressor 12 supplying compressed air from low pressure compressor 12 to high pressure compressor 14. The highly compressed air is delivered to combustor 16. Airflow from combustor 16 is channeled through a turbine nozzle (not shown in FIG. 1) to drive turbines 18 and 20, prior to exiting gas turbine engine 10 through an exhaust nozzle 24.

Figure 2:
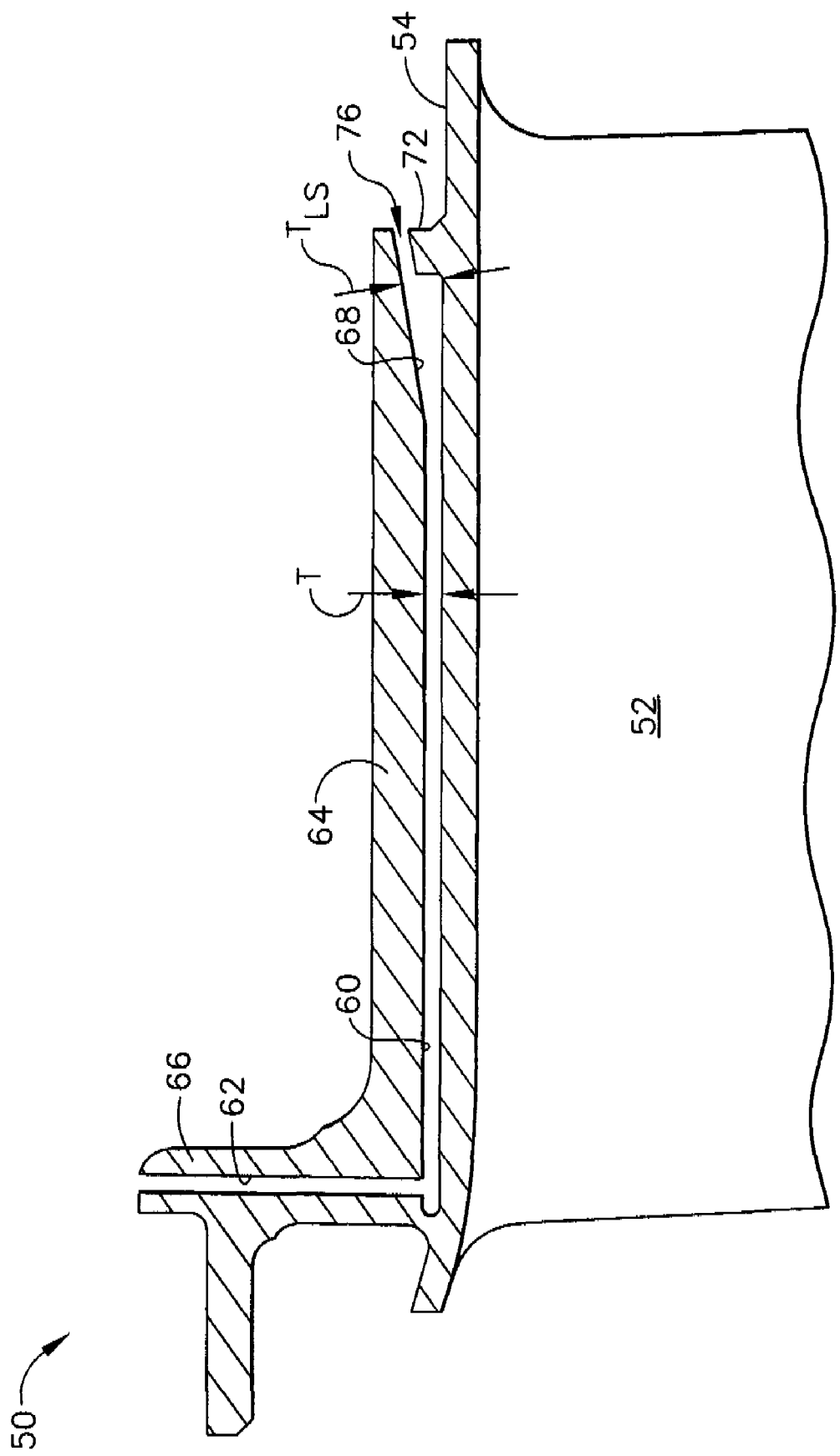
FIG. 2 is a side view of an exemplary turbine nozzle that may be used with the gas turbine engine shown in FIG. 1.

FIG. 2 is a side view of an exemplary turbine nozzle 50 that may be used with a gas turbine engine, such as turbine engine 10 (shown in FIG. 1). In the exemplary embodiment, nozzle 50 is one segment of a plurality of segments that are positioned circumferentially to form a nozzle assembly (not shown in FIG. 2) within the gas turbine engine. Nozzle 50 includes at least one airfoil vane 52 extending between an arcuate radially outer band or platform 54, and an arcuate radially inner band or platform (not shown). More specifically, in the exemplary embodiment, outer band 54 and the inner band are each integrally-formed with airfoil vane 52.

In the exemplary embodiment, nozzle 50 also includes an axial spline seal slot 60 and a radial spline seal slot 62 that are each formed in a generally axially-extending face 64 of nozzle 50. More specifically, slot 60 extends generally axially through a portion of face 64 and slot 62 extends generally radially through a radial flange 66 portion of nozzle 50. In the exemplary embodiment, slot 60 is also formed integrally with a loading slot portion 68 that facilitates the installation of axial spline seals (not shown) into the segmented nozzle assembly.

A thickness T of spline seal slot 60 is substantially constant through slot 60. In the exemplary embodiment, loading slot portion 68 is frusto-conical such that a thickness $T_{LS}$ of slot portion 68 increases from slot 60 to a stop projection 72 adjacent a trailing end 76 of slot portion 68. Stop projection 72 facilitates maintaining the spline seal within slot 60. In each embodiment, spline seal slot 60 is formed with a recessed area (not shown in FIG. 2) that is sized to receive a portion of a spline seal (not shown in FIG. 2) therein to facilitate maintaining the spline seal within slot 60, as described in more detail below.

During assembly of the nozzle assembly, a plurality of nozzles 50 are positioned circumferentially adjacent to each other to form the nozzle assembly. Specifically, nozzles 50 are positioned relative to each other such that a clearance gap is defined between each pair of circumferentially adjacent pairs of nozzles. More specifically, the clearance gap is defined between circumferentially adjacent and opposing nozzle end faces 64. To facilitate sealing the clearance gaps, spline seals (not shown in FIG. 2) are inserted within a pair of circumferentially adjacent spline seal slots 60. More specifically, when positioned within slots 60, each spline seal circumferentially bridges the clearance gap to facilitate preventing leakage through the gap.

Figure 3:
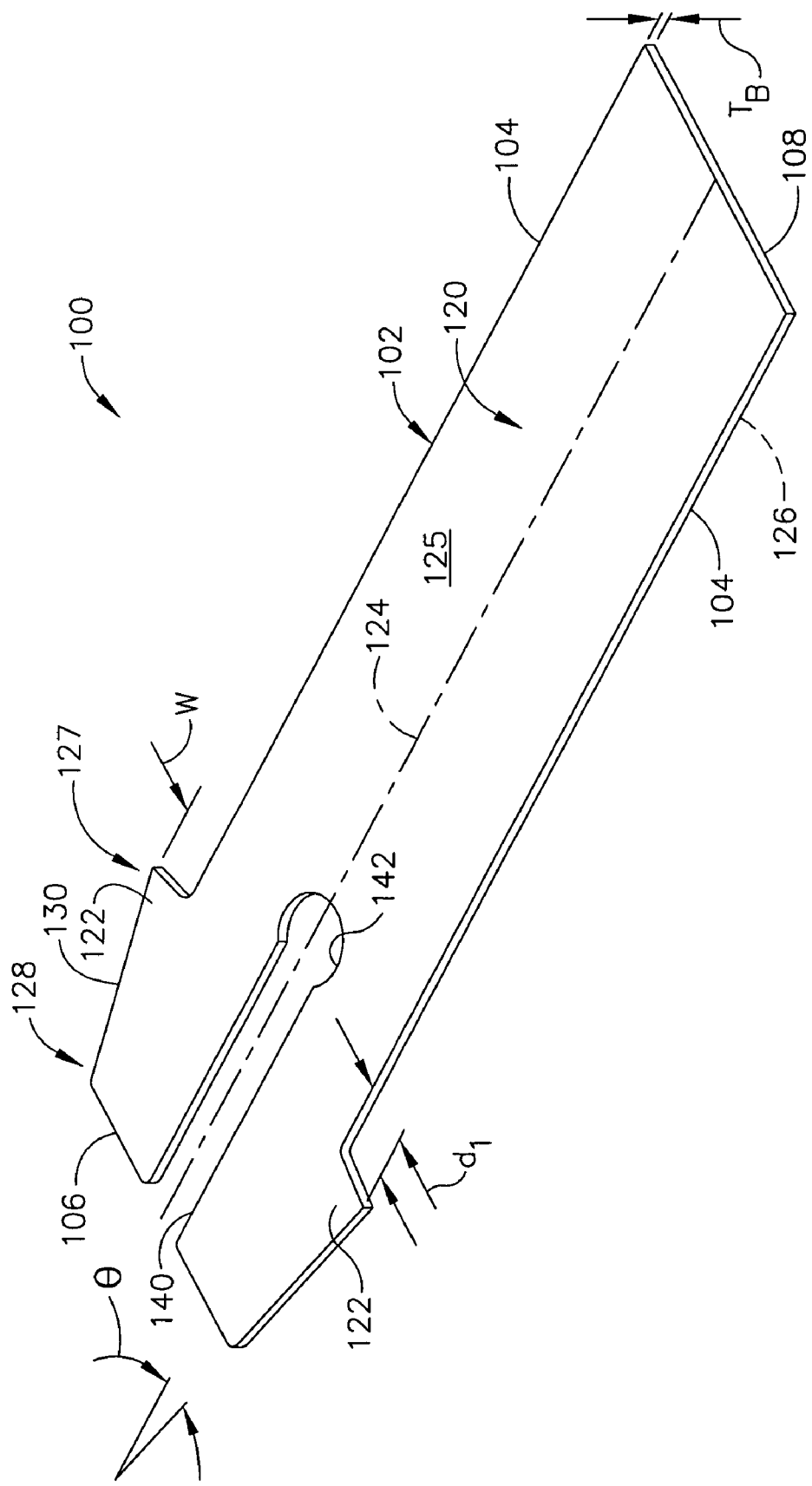
FIG. 3 is a perspective view of an exemplary spline seal that may be used with the turbine nozzle shown in FIG. 2.

FIG. 3 is a perspective view of an exemplary spline seal 100 that may be used in turbine nozzle 50 (shown in FIG. 2). In the exemplary embodiment, spline seal 100 is substantially rectangular and is bordered by an outer perimeter 102 including a pair of circumferentially-spaced sides 104 that are connected by a leading edge side 106 and a trailing edge side 108. Alternatively, spline seal 100 may have any non-rectangular shape that enables seal 100 to function as described herein. Moreover, in other embodiments, spline seal 100 may be oriented such that leading edge side 106 and trailing edge side 108 are inverted.

Spline seal 100 includes a body portion 120 and at least one catch 122. Specifically, in the exemplary embodiment, seal 100 is formed substantially symmetric about a centerline axis of symmetry 124, and thus includes a pair of opposed, identical catches 122. Body portion 120 is substantially planar and includes a radially outer surface 125 and an opposite radially inner surface 126. Body portion 120 is sized for insertion within spline seal slot 60 and has a thickness $T_B$ that is thinner than spline seal slot thickness T. In one embodiment, spline seal 100 is fabricated from a substantially flat piece of sheet metal.

Each catch 122 extends outward from body portion 120. Specifically, in the exemplary embodiment, each catch 122 extends obliquely outward from seal outer perimeter 102, and more specifically, from each seal side 104 adjacent leading edge side 106. More specifically, in the exemplary embodiment, a downstream side 127 of each catch 122 extends a longer distance $d_1$ outward from side 104 than an upstream side 128 of each catch 122. Accordingly, in the exemplary embodiment, each catch 122 is substantially triangular-shaped. Alternatively, at least one catch 122 may extend from any portion of body portion 120, or have any shape, that enables catch 122 to function as described herein. Moreover, although two catches 122 are illustrated, spline seal 100 may include more or less than two catches 122.

In the exemplary embodiment, because each catch 122 is triangular-shaped, an outer edge 130 of each catch 122 is oriented at an oblique angle θ with respect to body outer edge 104. Alternatively, catch 122 may be oriented at any angle θ with respect to outer edge 104 that enables catch 122 to function as described herein. In the exemplary embodiment, each catch 122 is formed integrally with body portion 120. Alternatively, at least one catch 122 may be coupled to body portion 120.

In the exemplary embodiment, spline seal 100 also includes a division slot or cut 140 that extends a distance axially downstream from spline seal leading edge side 106. In the exemplary embodiment, slot 140 is substantially centered between spline seal sides 104 and between catches 122. Alternatively, slot 140 is non-centered with respect to spline seal 100. Specifically, in the exemplary embodiment, slot 140 extends from spline seal leading edge 106 to a relief stop hole 142 extending through spline seal 100. Stop hole 142 facilitates reducing stresses that may be induced to spline seal 100 adjacent catches 122 and also facilitates preventing the initiation or propagation of cracks that may develop within spline seal 100 between catches 122. Slot 140 enables spline seal 100 to be inserted into spline seal slot 60 (shown in FIG. 2) as described in more detail below.

During assembly, spline seal 100 is inserted through loading slot portion 68 and into spline seal slot 60 such that spline seal 100 circumferentially bridges a clearance gap (not shown in FIG. 3) defined between adjacent nozzles 50 (shown in FIG. 2). More specifically, spline seal 100 is inserted into slot 60 such that seal leading edge side 106 is upstream from seal trailing edge side 108. Because an outer width W of spline seal 100 is wider than a width (not shown in FIG. 3) of slot 60, as defined between adjacent nozzles 50, seal slot 140 enables catches 122 to flex inward towards seal centerline 124 such that the outer width W of spline seal 100 is reduced and as such, spline seal 100 may be slidably positioned within slot 60. More specifically, in the exemplary embodiment, when spline seal 100 is fully inserted into slot 60, each catch 122 is biased to extend outward from spline seal body portion 120 and is received within a recessed area defined within slot 60. The recessed areas retain each catch 122, which limits the axial movement of spline seal 100 within slot 60. As such, because the axial movement of spline seal 100 is limited, catches 122 facilitate maintaining each seal 100 within spline seal slot 60, and thus facilitate preventing spline seal 100 from undesirably slipping or backing out from slot 60. As a result, each catch 122 facilitates minimizing leakage through the segmented turbine nozzle assembly clearance gaps and thus facilitates enhancing engine performance and component life expectancy.

Figure 4:
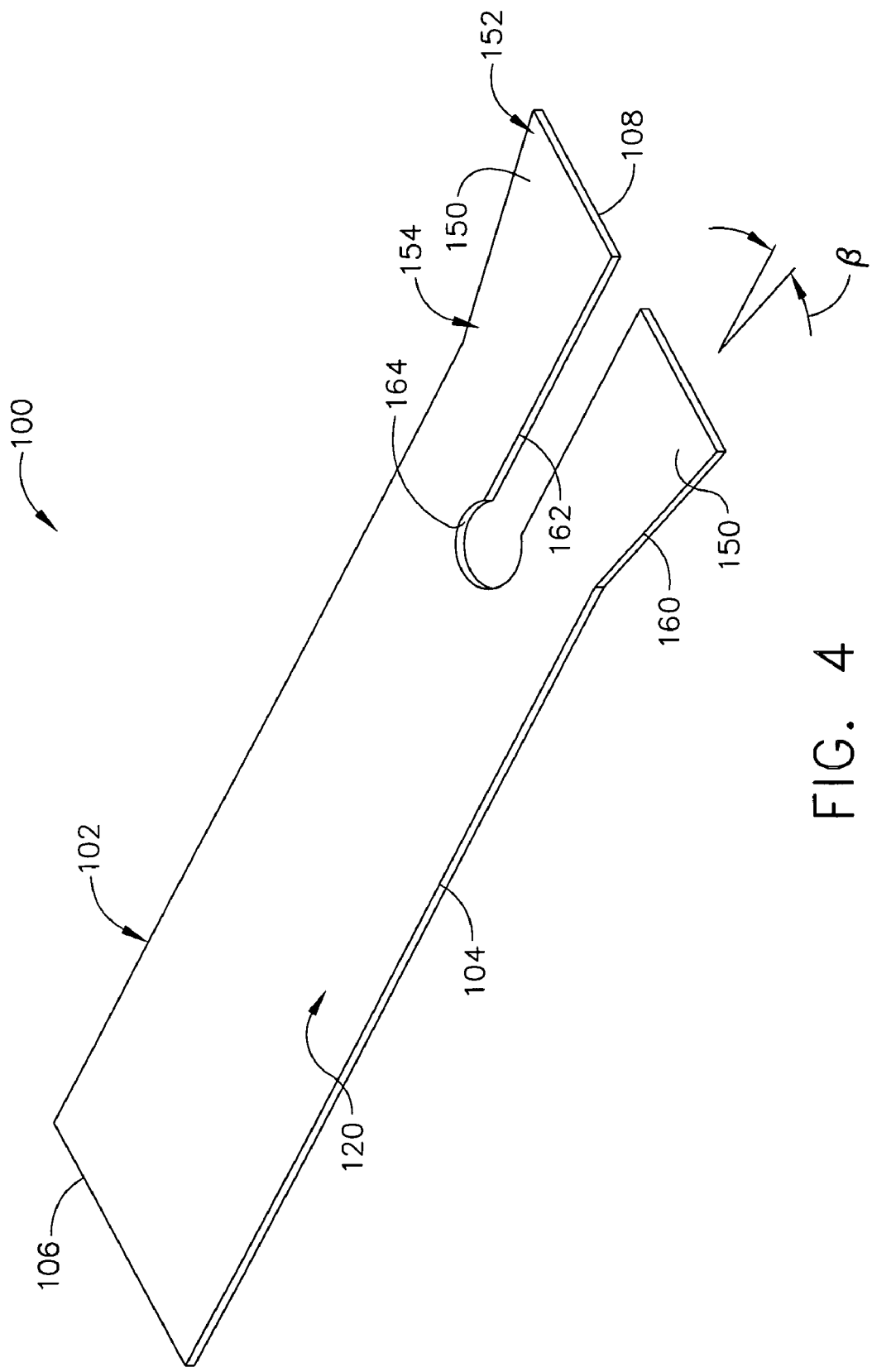
FIG. 4 is a perspective view of an alternative embodiment of the spline seal shown in FIG. 3.

FIG. 4 is a perspective view of an alternative embodiment of spline seal 100. The embodiment illustrated in FIG. 4 is substantially similar to the embodiment illustrated in FIG. 3 and components of spline seal 100 illustrated in FIG. 4 that are identical to components of spline seal 100 illustrated in FIG. 3, are identified in FIG. 4 using the same reference numerals used in FIG. 3. Accordingly, spline seal 100 includes at least one catch 150 that extends outward from body portion 120 and, more specifically, outward from seal outer perimeter 102.

In the exemplary embodiment, each catch 150 extends obliquely outward from seal outer perimeter 102, and more specifically, from each seal side 104 adjacent trailing edge side 108. More specifically, in the exemplary embodiment, a downstream side 152 of each catch 150 extends a greater distance outward from each side 104 than catch upstream side 154 extends from side 104. Accordingly, in the exemplary embodiment, each catch 150 is substantially triangular-shaped. Alternatively, at least one catch 150 may extend from any portion of body portion 120, or have any shape, that enables catch 150 to function as described herein. Moreover, although two catches 150 are illustrated, spline seal 100 may include more or less than two catches 150.

In the exemplary embodiment, because each catch 150 is triangular-shaped, an outer edge 160 of each catch 150 is oriented at an oblique angle β with respect to body outer edge 104. Alternatively, catch 150 may be oriented at any angle β with respect to outer edge 104 that enables catch 150 to function as described herein. In the exemplary embodiment, each catch 150 is formed integrally with body portion 120. Alternatively, at least one catch 150 may be coupled to body portion 120.

In the exemplary embodiment, spline seal 100 also includes a division slot or cut 162 that extends a distance axially upstream from spline seal trailing edge side 108. In the exemplary embodiment, slot 162 is substantially centered between spline seal sides 104 and between catches 150. Alternatively, slot 162 is non-centered with respect to spline seal 100. Specifically, in the exemplary embodiment, slot 162 extends from spline seal trailing edge 108 to a relief stop hole 164 extending through spline seal 100. Stop hole 164 facilitates reducing stresses that may be induced to spline seal 100 adjacent catches 150 and also facilitates preventing the initiation or propagation of cracks that may develop within spline seal 100 between catches 150. Similar to slot 140, slot 162 enables spline seal 100, and specifically catches 150, to flex to such that seal 100 may be inserted into spline seal slot 60 (shown in FIG. 2).

During assembly, when spline seal 100 is fully inserted within spline seal slot 60, each catch 150 extends outward from spline seal body portion 120 and is received within a recessed area (not shown in FIG. 4) defined within slot 60. The recessed areas retain each catch 150, which limits the axial movement of spline seal 100 within slot 60. As such, because the axial movement of spline seal 100 is limited, catches 150 facilitate maintaining each seal 100 within spline seal slot 60, and thus facilitate preventing spline seal 100 from undesirably slipping or backing out from slot 60. As a result, each catch 150 facilitates minimizing leakage through the segmented turbine nozzle assembly clearance gaps and thus facilitates enhancing engine performance and component life expectancy.

Figure 5:
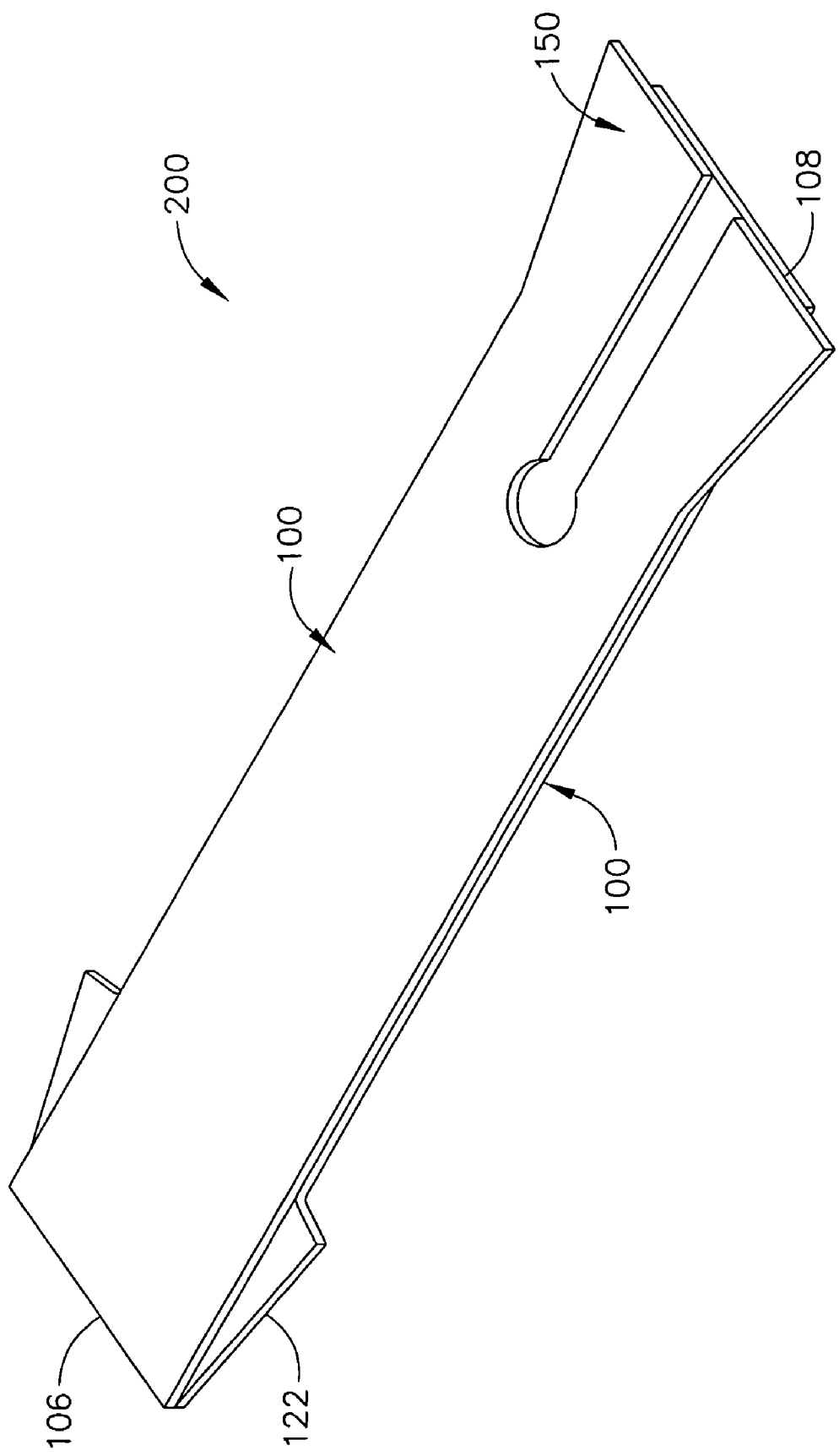
FIG. 5 is perspective view of an exemplary spline seal assembly formed using the spline seals shown in FIGS. 3 and 4.
Figure 6:
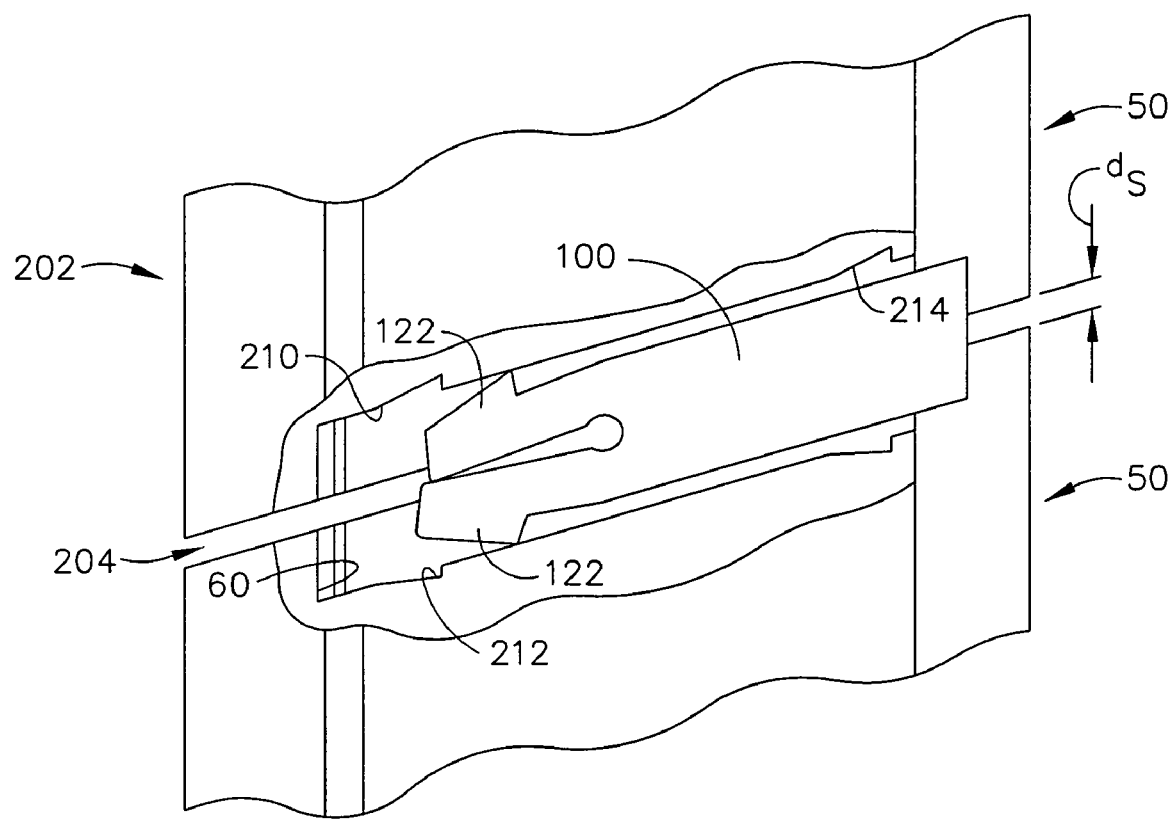
FIG. 6 is a partial cut-away plan view of the spline seal assembly shown in FIG. 5 during installation in an exemplary turbine nozzle assembly.

FIG. 5 is perspective view of an exemplary spline seal assembly 200 formed using the spline seal embodiments shown in FIGS. 3 and 4. FIG. 6 is a partial cut-away plan view of a partial installation of spline seal assembly 200 in an exemplary turbine nozzle assembly 202. In the exemplary embodiment, nozzle assembly 202 includes a pair of circumferentially-adjacent turbine nozzles 50 that are spaced a circumferential distance $d_S$ apart such that a clearance gap 204 is defined between nozzles 50. As shown in FIG. 6, each nozzle spline seal slot 60 is formed with at least one recessed area 210 depending on the application and the seal assembly 200 being utilized.

In the exemplary embodiment, each spline seal slot 60 includes a forward recessed area 212 and an aft recessed area 214. Each recessed area 210 is sized to receive a catch 122 or 150 therein to facilitate retaining seal assembly 200 within slot 60 during engine operation. Specifically, the size, shape, and number of areas 210 is variably selected based on the seal assembly 200 being utilized.

As shown in FIG. 5, seal assembly 200 is fabricated from a pair of seals 100 coupled together. Specifically, the embodiment of the seal 100 shown in FIG. 3 is coupled against the embodiment of the seal 100 shown in FIG. 4. As such, seal assembly 200 includes two forward catches 122 and two aft catches 150. In an alternative embodiment, any number of catches 122 and/or 150 may be utilized depending on the application. In one embodiment, seals 100 are coupled together prior to being inserted in slot 60. Alternatively, and as shown in FIG. 6, each seal 100 within seal assembly 200 is inserted independently into slot 60.

During assembly of seal assembly 200 within nozzle assembly 202, initially a first seal 100 is inserted within slot 60 and is slid through slot 60 until catches 122 are received in forward recessed areas 212. In the exemplary embodiment, a second seal 100 is then inserted within slot 60 such that the second spline seal 100 is against the first spline seal, and such that the catches 150 extending from the second spline seal 100 are received within recessed areas 214. As such, when spline seal assembly 200 is fully inserted into slot 60, because catches 122 and 150 are biased outward from respective spline seal body portions 120, catches 122 and 150 facilitate limiting an amount of axial movement of spline seals 100. As such, during engine operation, catches 122 and 150 facilitate maintaining spline seal assembly 200 within spline seal slot 60, and thus facilitates preventing spline seals 100 from undesirably slipping or backing out from slot 60. As a result, catches 122 and 150 facilitate minimizing leakage through the segmented turbine nozzle assembly clearance gaps 204 and thus facilitates enhancing engine performance and component life expectancy.

Figure 8:
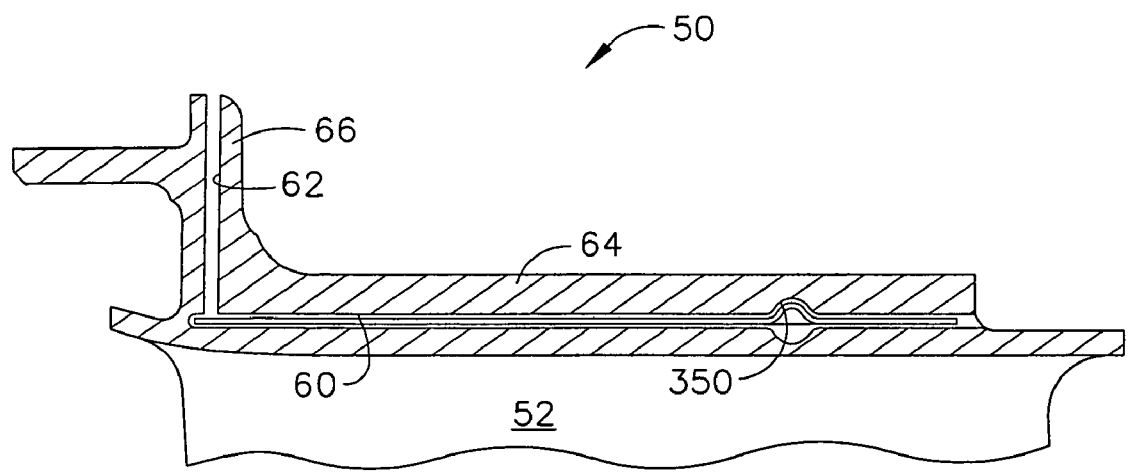
FIG. 8 is a side view of the spline seal shown in FIG. 7 and installed in an alternative embodiment of the turbine nozzle shown in FIG. 2.
Figure 7:
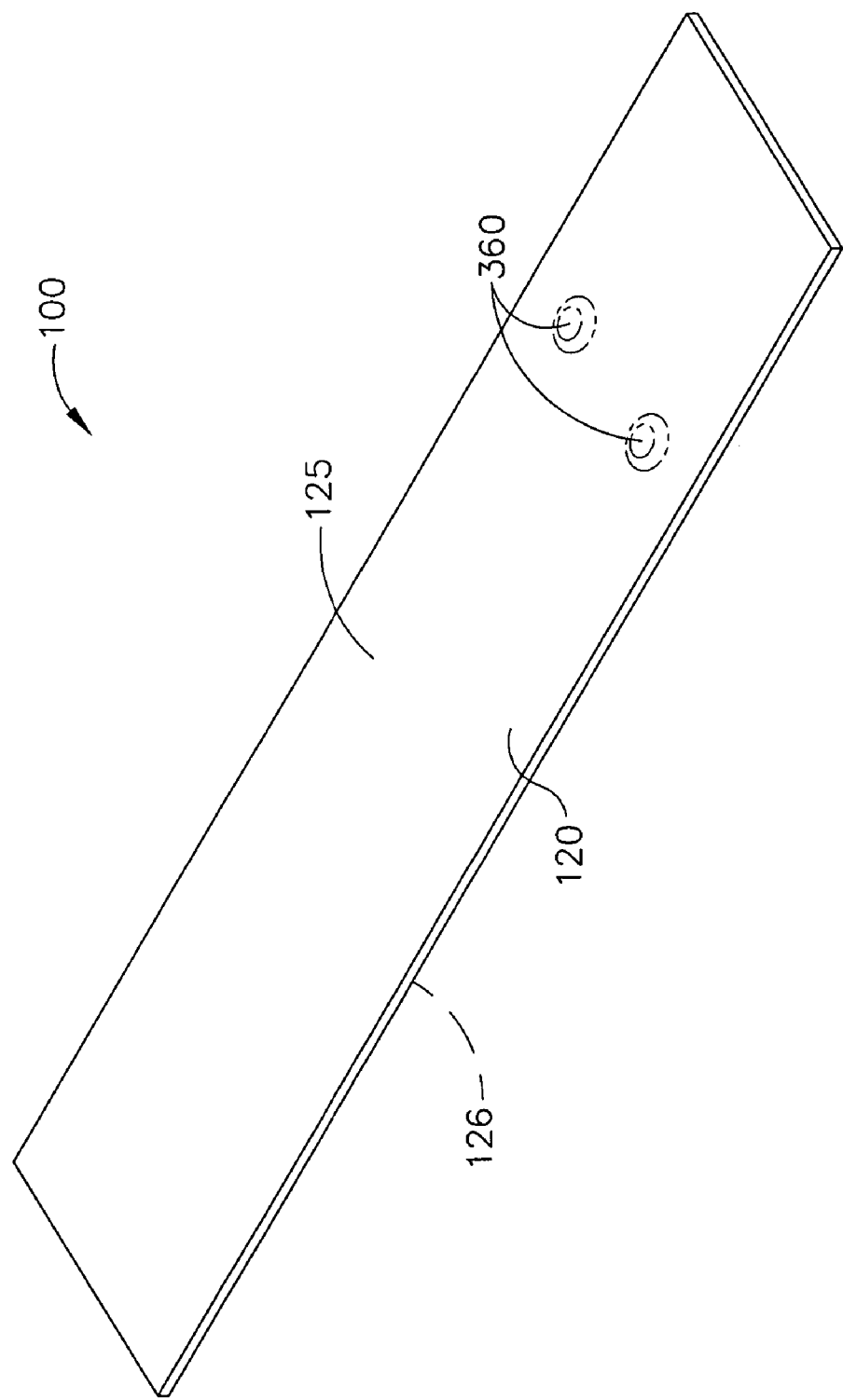
FIG. 7 is a perspective view of another alternative embodiment of the spline seal shown in FIG. 3.

FIG. 7 is a perspective view of a further alternative embodiment of a spline seal 100 that may be used within gas turbine engine 10 (shown in FIG. 1). FIG. 8 is a side view of the embodiment of the seal 100 illustrated in FIG. 7 and coupled within an alternative embodiment of turbine nozzle 50. The spline seal embodiment illustrated in FIG. 7 is substantially similar to the embodiment illustrated in FIG. 3, and components of spline seal 100 illustrated in FIG. 7 that are identical to components of spline seal 100 illustrated in FIG. 3, are identified in FIG. 7 using the same reference numerals used in FIG. 3. Moreover, the turbine nozzle embodiment illustrated in FIG. 8 is substantially similar to the turbine nozzle embodiment illustrated in FIG. 2, and components of spline seal 100 illustrated in FIG. 8 that are identical to components of spline seal 100 illustrated in FIG. 2, are identified in FIG. 8 using the same reference numerals used in FIG. 2. Accordingly, turbine nozzle 50 includes at least one airfoil vane 52, axial spline seal slot 60 and radial spline seal slot 62.

As shown in FIG. 8, slot 60 includes at least one recessed area 350 that facilitates receiving a catch 360 extending from a spline seal 100 inserted therein, as described below in more detail. More specifically, in the exemplary embodiment, each recessed area 350 extends radially outward and/or radially inward from slot 60 depending on the slot seal 100 to be inserted within slot 60.

As shown in FIG. 7, in the exemplary embodiment, spline seal 100 includes two catches 360 that project outward from body portion 120 and, more specifically, outward from radially outer surface 125. The number, size, location, and shape of catches 360 are variably selected depending on the application. In the exemplary embodiment, catches 360 are substantially circular. In an alternative embodiment, spline seal 100 may also include at least one catch 360 that either also, or only, projects outward from radially inner surface 126.

During engine operation, when spline seal 100 is fully inserted into slot 60, because catches 360 extends outward from spline seal radially outer surface 125, catches 360 are received within recessed areas 350 and facilitate limiting an amount of radial and axial movement of spline seal 100. As such, during engine operation, catches 360 facilitate maintaining spline seal 100 within spline seal slot 60, and thus facilitate preventing spline seal 100 from undesirably slipping or backing out from slot 60. As a result, catches 360 facilitate minimizing leakage through the segmented turbine nozzle assembly clearance gaps and thus facilitates enhancing engine performance and component life expectancy.

In an alternative embodiment, catches 360 are received in recessed areas formed on an adjacent spline seal 100, for example, as is illustrated in FIG. 6. In such an embodiment, catches 360 facilitate interlocking the seals 100 within the seal assembly together to facilitate preventing either seal 100 from undesirably slipping or backing out from slot 60.

In each embodiment, the above-described spline seals include at least one catch that facilitates preventing the spline seal from inadvertently backing out of the nozzle assembly spline seal slots. More specifically, in each embodiment, each catch extends outward from the body portion of the spline seal to facilitate limiting movement of the spline seal within the spline seal slot. As a result, during engine operation, the catches facilitate reducing leakage through the clearance gap defined between circumferentially adjacent turbine nozzles. Accordingly, engine performance and component useful life are each facilitated to be enhanced in a cost effective and reliable means. Moreover, the invention provides a means wherein existing spline seal slots can be modified to facilitate enhancing turbine engine performance.

Exemplary embodiments of turbine nozzles are described above in detail. The spline seals are not limited to use with the specific nozzle embodiments described herein, but rather, the spline seals can be utilized independently and separately from other turbine nozzle components described herein. Moreover, the invention is not limited to the embodiments of the spline seals described above in detail. Rather, other variations of spline embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
   coupling a first turbine nozzle within the engine;
   coupling a second turbine nozzle circumferentially adjacent the first turbine nozzle such that a gap is defined between the first and second turbine nozzles;
   providing at least one spline seal including a substantially planar body;
   forming at least one catch to extend outward from the at least one spline seal body; and
   inserting the at least one spline seal axially through a trailing end of a slot defined in at least one of the first and second turbine nozzles by deforming a portion of the at least one spline seal within the slot to facilitate positioning the at least one spline seal with respect to the first and second turbine nozzles to facilitate reducing leakage through the gap, such that a portion of the at least one catch is received within a recess defined within the turbine nozzle slot to facilitate retaining the at least one spline seal within the turbine nozzle slot.

2. A method in accordance with claim 1 wherein forming at least one catch further comprises forming a slot within the at least one spline seal body.

3. A method in accordance with claim 1 wherein forming at least one catch further comprises:
   forming a first catch to extend outward from a first side of the at least one spline seal body; and
   forming a second catch to extend outward from an opposite second side of the at least one spline seal body.

4. A method in accordance with claim 1 wherein inserting the at least one spline seal into a slot further comprises:
   inserting a first spline seal into the slot; and
   inserting a second spline seal into the slot such that a catch extending from the first spline seal facilitates interlocking the first and second spline seals relative to each other.

5. A seal assembly for use with a turbine engine nozzle assembly, said seal assembly comprising at least one spline seal sized for insertion within a slot formed within a turbine nozzle, said at least one spline seal configured to facilitate reducing leakage through the turbine engine nozzle assembly, said at least one spline seal comprising a substantially planar body comprising at least one flexible catch extending outward from said body, wherein said at least one spline seal is insertable axially through a trailing end of the slot by deforming a portion of said at least one spline seal within the slot to facilitate positioning said at least one spline seal with respect to the turbine nozzle such that a portion of said at least one catch is received within a recess defined within said turbine nozzle slot.

6. A seal assembly in accordance with claim 5 wherein said at least one catch facilitates maintaining said at least one spline seal within said turbine nozzle slot.

7. A seal assembly in accordance with claim 5 wherein said at least one catch extends outward from an edge of said body.

8. A seal assembly in accordance with claim 5 wherein said body is substantially rectangular and comprises an upper surface and an opposite lower surface, said at least one catch extends outward from one of said upper surface and said lower surface.

9. A seal assembly in accordance with claim 5 wherein said body further comprises a slot defined therein.

10. A seal assembly in accordance with claim 5 wherein said at least one catch is configured to interlock a first of said at least one spline seals with a second of said at least one spline seals.

11. A seal assembly in accordance with claim 5 wherein said catch is sized for insertion in a recess defined within the turbine nozzle slot.

12. A seal assembly in accordance with claim 5 wherein said at least one catch comprises a first catch extending outward from body in a first angular direction, and a second catch extending outward from said body in a second angular direction.

13. A turbine nozzle assembly for a gas turbine engine, said nozzle assembly comprising:
   a plurality of turbine nozzles each comprising an outer band, an inner band, and at least one airfoil vane extending between said outer and inner bands, a portion of each of said plurality of turbine nozzles defines a slot therein, said slot comprises at least one recess; and
   a seal assembly comprising at least one spline seal sized for insertion within said turbine nozzle slot to facilitate reducing leakage between circumferentially adjacent pairs of said turbine nozzles, said at least one spline seal comprising a substantially planar body and at least one flexible catch extending outward from said body, said at least one spline seal insertable axially through a trailing end of said slot by deforming a portion of said at least one spline seal within said slot to facilitate positioning said at least one spline seal with respect to said circumferentially adjacent pairs of said turbine nozzles such that a portion of said at least one catch is received within a recess defined within said slot.

14. A turbine nozzle assembly in accordance with claim 13 wherein said at least one spline seal body is formed integrally with said at least one catch, said at least one catch extends obliquely from an outer periphery of said spline seal body.

15. A turbine nozzle assembly in accordance with claim 13 wherein said at least one spline seal body further comprises a slot defined therein.

16. A turbine nozzle assembly in accordance with claim 13 wherein said at least one catch facilitates maintaining said at least one spline seal within said turbine nozzle slot.

17. A turbine nozzle assembly in accordance with claim 13 wherein said at least one spline seal body is substantially rectangular and comprises an upper surface and an opposite lower surface, said at least one catch extends outward from one of said upper surface and said lower surface.

18. A turbine nozzle assembly in accordance with claim 13 wherein said at least one catch is configured to interlock a first of said at least one spline seals to a second of said at least one spline seals.

19. A turbine nozzle assembly in accordance with claim 13 wherein said catch is sized for insertion within said at least one turbine nozzle slot recess.

* * * * *